US00RE35705E

United States Patent [19]

Moldovanyi

[11] E Patent Number: Re. 35,705

[45] Reissued Date of Patent: Dec. 30, 1997

[54] GAS ASSISTED INJECTION MOLDING APPARATUS UTILIZING SLEEVE AND PIN ARRANGEMENT

[75] Inventor: Jay F. Moldovanyi, Brecksville, Ohio

[73] Assignee: Nitrojection Corporation, Chagrin Falls, Ohio

[21] Appl. No.: 531,430

[22] Filed: Sep. 21, 1995

Related U.S. Patent Documents

Reissue of:

[64] Patent No.: 5,256,047
Issued: Oct. 26, 1993
Appl. No.: 801,949
Filed: Dec. 3, 1991

[51] Int. Cl.[6] ..... B29C 45/23

[52] U.S. Cl. ..... 425/130; 264/572; 425/573

[58] Field of Search ..... 425/130, 562, 425/563, 564, 566, 570, 571, 573; 264/572

[56] References Cited

U.S. PATENT DOCUMENTS

| | | |
|---|---|---|
| 2,940,123 | 6/1960 | Beck et al. . |
| 4,033,710 | 7/1977 | Hanning . |
| 4,106,887 | 8/1978 | Yasuike et al. . |
| 4,140,672 | 2/1979 | Kataoka . |
| 4,285,661 | 8/1981 | Yotsutsuji et al. . |
| 4,474,717 | 10/1984 | Hendry . |
| 4,657,496 | 4/1987 | Ozeki et al. . |
| 4,740,150 | 4/1988 | Sayer . |
| 4,824,732 | 4/1989 | Hendry et al. . |
| 4,905,901 | 3/1990 | Johnson . |
| 4,923,667 | 5/1990 | Sayer . |
| 4,990,083 | 2/1991 | Bernhardt . |
| 5,030,076 | 7/1991 | Ebenhofer et al. . |
| 5,044,924 | 9/1991 | Loren . |
| 5,049,056 | 9/1991 | Baxi et al. . |
| 5,066,214 | 11/1991 | Baxi et al. . |
| 5,069,858 | 12/1991 | Hendry . |
| 5,076,778 | 12/1991 | Strunk et al. . |
| 5,106,283 | 4/1992 | Sauer et al. . |
| 5,135,703 | 8/1992 | Hunerberg et al. . |
| 5,162,092 | 11/1992 | Klobucar et al. . |
| 5,164,200 | 11/1992 | Johnson . |
| 5,173,241 | 12/1992 | Shibuya et al. . |
| 5,204,051 | 4/1993 | Jaroschek . |
| 5,208,046 | 5/1993 | Shah et al. . |
| 5,273,707 | 12/1993 | Carroll . |
| 5,318,433 | 6/1994 | Loren . |
| 5,409,659 | 4/1995 | Matsumoto et al. . |

FOREIGN PATENT DOCUMENTS 1929343 12/1970 Germany .

OTHER PUBLICATIONS

*Machine Design* article entitled "The Best of Two Worlds in Plastics Processing" (Dec. 9, 1982 issue) (4 pages).

*Primary Examiner*—Tim Heitbrink
*Attorney, Agent, or Firm*—Fay, Sharpe, Beall, Fagan, Minnich & McKee

[57] ABSTRACT

An apparatus for use in fluid assisted injection molding of plastic material so as to form an injection molded product includes a pair of mold members defining when closed the sealed cavity, a first opening provided in one of the mold members for allowing the injection of plastic material into the cavity and the second opening provided in one of the mold members, and spaced from the first opening, for allowing the injection of the fluid into the cavity. A sleeve extends through the second opening. The sleeve has a longitudinally extending bore with an open first end. Preferably, the sleeve is rigidly secured in relation to the one of the mold members through which it extends. A pin extends through the sleeve with the pin having a first end, located adjacent the sleeve first end, and a second end. Preferably the pin in rigidly secured in relation to the sleeve. A fluid flow passage is defined between the pin and the sleeve. In another embodiment, the fluid flow passage is defined between a tube and a pin. The tube is secured at one end to a bushing body. The busing is, in turn, positioned between a nozzle of an injection molding machine and a sprue of a mold cavity. In yet another embodiment, the pin is allowed to reciprocate in relation to the sleeve so as to selectively open and close a fluid flow passage defined between the pin and the sleeve.

36 Claims, 5 Drawing Sheets

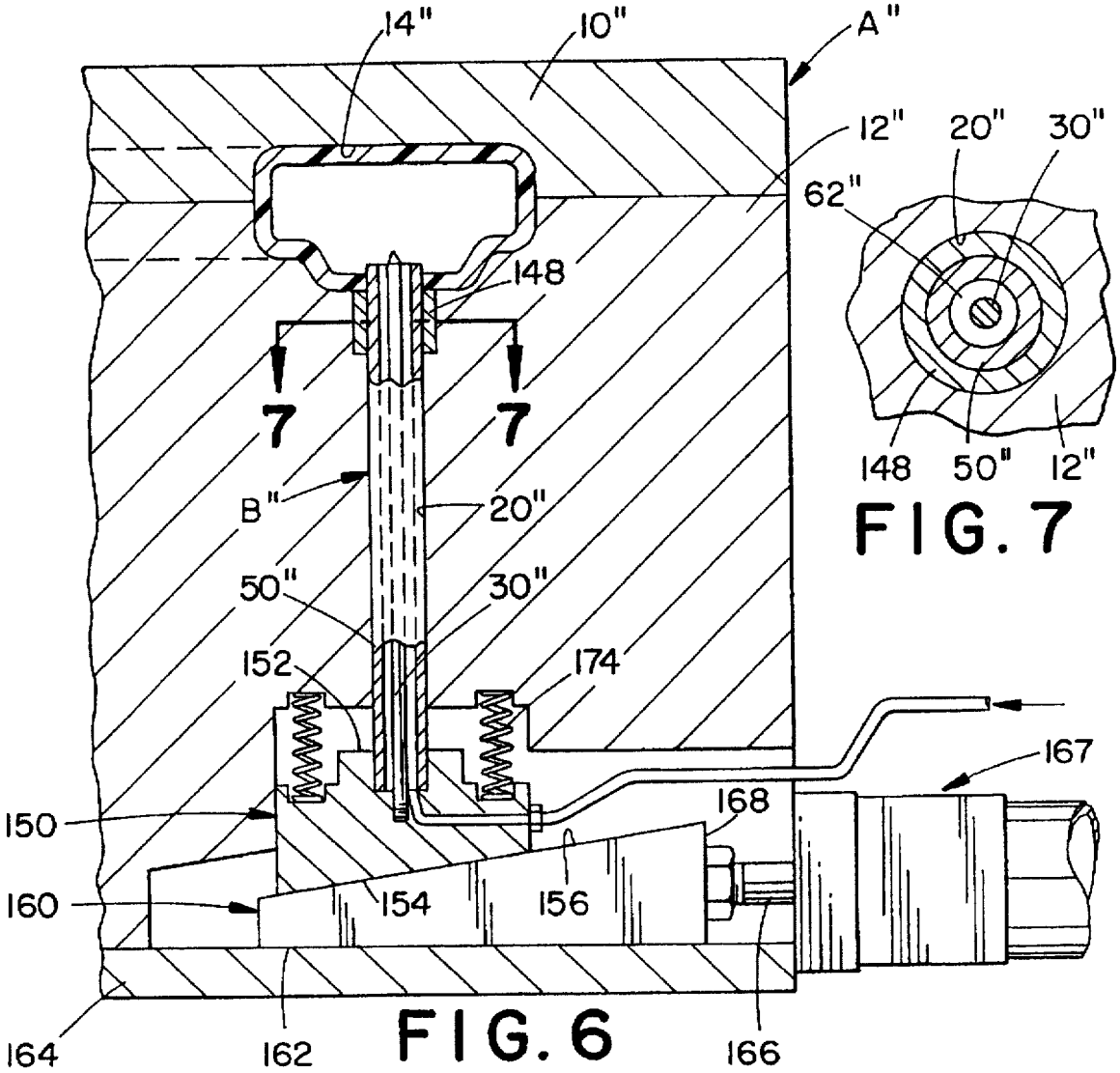
FIG. 7
FIG. 6
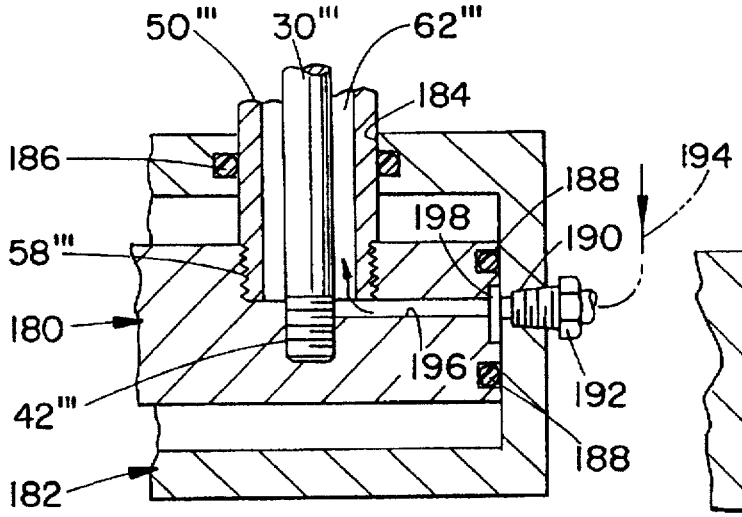
FIG. 9
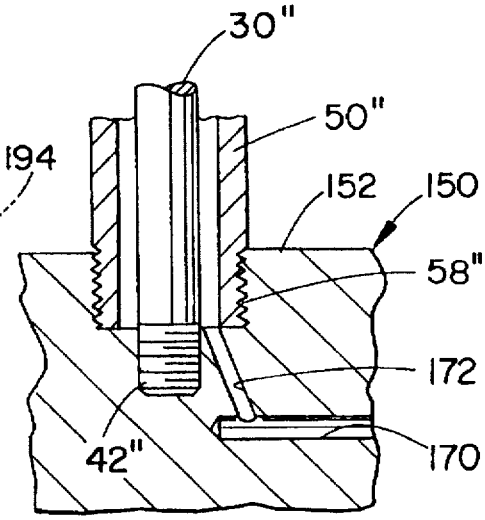
FIG. 8

GAS ASSISTED INJECTION MOLDING APPARATUS UTILIZING SLEEVE AND PIN ARRANGEMENT

Matter enclosed in heavy brackets [ ] appears in the original patent but forms no part of this reissue specification; matter printed in italics indicates the additions made by reissue.

BACKGROUND OF THE INVENTION

This invention generally pertains to injection molding apparatus. More specifically, the present invention relates to a fluid assisted injection molding apparatus which utilizes a pin positioned in the sleeve such that a fluid flow passage is defined between the pin and the sleeve.

The invention is particularly applicable to a gas assisted injection molding process in which a nozzle is utilized to inject a viscous fluid such as a molten plastic into a mold cavity and a non-viscous fluid such as a gas is also injected to the mold cavity through a separate opening. However, it will be appreciated by those skilled in the art that the invention has broader applications and may also be adapted for use in many other injection molding environments where both a relatively viscous fluid, such as a plastic or wax, and a relatively non-viscous fluid such as a gas or liquid are injected into a mold cavity.

Recently, gas assisted injection molding has gained popularity. In this process, the mold cavity is filled with a plasticized thermoplastic material, usually to a volume less than 100% of the mold cavity, and inert gas is injected under pressure into the plasticized material to fill the rest of the volume in the mold cavity. The gas runs along specially designed channels in the mold so as to create a continuous network of hollowed-out sections in the molded product. Gas assisted injection molding allows for a reduction of stress and warpage, elimination of sink marks, and the provision of smooth surfaces on the injection molded part. In addition, clamp tonnage requirements can be reduced in comparison to conventional injection molding processes. The process also permits the use of different wall thicknesses for a single part and faster cycle times in comparison to conventional injection molding processes. Also, gas assisted injection molding reduces the need for external flow runners.

A variety of nozzles which regulate the flow of both plastic and gas are known. However, for the production of some moldings, especially moldings of complex design, it is desirable to introduce the pressurized gas or other relatively non-viscous fluid at a different location than that at which the plastic is introduced, or perhaps at several locations, all of which are spaced from the plastic injection point. Such a situation may arise, for example, when it is desired to employ a hot runner system where the choice of gate positions is restricted by the desire to avoid an overabundance of gas channels which otherwise would need to be connected to one another.

Certain sprue bushing arrangements are known which enable one to retrofit a gas injection system onto a conventional plastic injection molding machine without extensive modifications. Several in-article gas-injection systems are also known. One major problem, with the known gas assisted injection molding nozzles, the known in-article gas injection pins, as well as with the known gas-injection sprue bushings, is the plugging of the gas channels in these devices with thermoplastic during the venting of the gas. In addition, the gas piping and valves downstream from the apparatus can become plugged. The apparatus then becomes useless until the channels are cleaned out which is a time consuming, difficult, and expensive process.

Accordingly, it has been considered desirable to develop a new and improved injection molding apparatus for in-article and in-runner fluid injection as well as sprue bushing type fluid injection which would overcome the foregoing difficulties and others, while providing better and more advantageous overall results.

BRIEF SUMMARY OF THE INVENTION

In accordance with the present invention, a new and improved apparatus is provided for use in fluid assisted injection molding with plastic material so as to form an injection molded product.

More particularly, in accordance with this aspect of the invention, the apparatus comprises a pair of mold members defining when closed a sealed cavity. A first opening is provided in one of the mold members for allowing the injection of the plastic material into the cavity. A second opening is provided in one of the mold members, and spaced from the first opening, for allowing the injection of the fluid into the cavity. A sleeve extends through the second opening. The sleeve has a longitudinally extending bore with an open first end. A first means is provided for rigidly securing the sleeve in relation to the one of the mold members. A pin extends through the sleeve. A second means is provided for rigidly securing the pin in relation to the sleeve. A fluid flow passage is defined between the pin and the sleeve.

In one embodiment of the apparatus, the pin and sleeve are mounted in a stationary fashion on a support base which is fixed to a mold half. In another embodiment, the pin and sleeve are mounted on a support base which enables the pin and sleeve to reciprocate in relationship to a mold half.

According to another embodiment of the present invention, a bushing is provided which is used in an injection molding machine and positioned between a nozzle and a sprue thereof.

More particularly in accordance with this aspect of the invention, the bushing comprises a body having a longitudinal axis, a front and a rear end, and an exterior periphery. A first bore extends parallel to the longitudinal axis of the body from the rear end to the front end of the body for accommodating a first fluid. A bridge extends transversely across the first bore between opposing walls of the bore adjacent the body first end such that fluid flow is allowed in the first bore around the bridge. A second bore extends in the bridge and in the body for accommodating a second fluid, the second bore terminating adjacent the body front end. A sleeve first end is secured to the body front end and the sleeve extends away therefrom such that a sleeve second end is located forwardly of the body. The sleeve has a through bore which is in communication with the second bore. A pin extends longitudinally in the sleeve through bore and a fluid flow passage is defined between the sleeve and the pin.

If desired, an outer sleeve can be secured to the body front end. A second end of the outer sleeve extends away from the body first end in a direction coaxial with the sleeve and encircling the sleeve.

In accordance with a further aspect of the invention, an apparatus is provided for use in fluid assisted injection molding for plastic material so as to form an injection molded product.

More particularly in accordance with this aspect of the invention, the apparatus comprises a pair of mold members defining when closed a sealed cavity. A first opening is provided in one of the mold members for allowing the injection of the plastic material into the cavity. A second opening is provided in one of the mold members, and spaced from the first opening, for allowing the injection of a fluid into the cavity. A sleeve extends through the second opening, the sleeve having a longitudinally extending bore with an open first end and an open second end. A pin extends through the sleeve bore, the pin having a first end located adjacent the sleeve first end and a second end. A means is provided for selectively reciprocating one of the sleeve and the pin in relation to the other of the sleeve and the pin. A fluid flow passage is defined between the pin and the sleeve.

Preferably, a means is provided for selectively sealing the fluid flow passage defined between the pin and the sleeve. In addition, preferably a means is provided for cleaning the fluid flow passage.

One advantage of the present invention is the provision of a new and improved apparatus for use in fluid-assisted injection molding.

Another advantage of the present invention is the provision of a fluid assisted injection molding apparatus which is not as prone to plugging as are the known constructions of this type.

Still another advantage of the present invention is the provision of a fluid assisted injection molding apparatus in which a flow path is defined between a pin and a sleeve in which the pin is secured. The flow path can be annular in shape and the pin can be in the form of a right cylinder so as to define an annular flow path of constant diameter. However, the pin could also have many other configurations so as to define other types of flow paths.

An additional advantage of the present invention is the provision of an apparatus in which a relatively viscous material, such as a plastic, is introduced at a first location into a mold cavity and a relatively non-viscous fluid, such as a gas, is introduced at a second location which may be spaced from the first location.

Yet another advantage of the present invention is the provision of a new and improved sprue bushing which can be utilized to retrofit a conventional injection molding nozzle to allow it to use fluid assist.

Yet still another advantage of the present invention is the provision of a fluid assisted injection molding apparatus which utilizes a stationary probe to allow a flow of a fluid into and out of a mold cavity.

Still yet another advantage of the present invention is the provision of a fluid assisted injection molding apparatus which utilizes a reciprocating probe to allow a flow of fluid into and out of the mold cavity.

A further advantage of the present invention is the provision of a fluid assisted injection molding apparatus which utilizes a pin and sleeve construction in which one of the pin and sleeve is selectively caused to reciprocate in relation to the other of the pin and sleeve to selectively allow a flow of fluid into and out of the mold cavity.

A yet further advantage of the present invention is the provision of a gas assisted injection molding apparatus in which a control means, preferably in the form of a programmable microprocessor, is utilized for controlling the operation of a means for reciprocating a pin as well as a means for supplying fluid to a flow path defined between the pin and an adjoining sleeve.

Still further advantages of the present invention will become apparent to those of ordinary skill in the art upon reading and understanding the following detailed description of the preferred and alternate embodiments.

BRIEF DESCRIPTION OF THE DRAWINGS

The invention may take form in certain parts and arrangements of parts preferred and alternate embodiments of which will be described in detail in this specification and illustrated in the accompanying drawings which form a part hereof and wherein:

FIG. 6 is a schematic side elevational view of a fluid assisted injection molding apparatus and a mold according to a second alternate embodiment of the present invention;

FIG. 7 is a cross-sectional view of a portion of the apparatus of FIG. 6 along lines 7—7;

FIG. 8 is an enlarged side elevational view partially in cross section of a portion of the apparatus of FIG. 6;

FIG. 9 is a schematic side elevational view partially in cross-section, of a portion of a fluid assisted injection molding apparatus according to a third alternate embodiment of the present invention;

DETAILED DESCRIPTION OF THE PREFERRED AND ALTERNATE EMBODIMENTS

Figure 1:
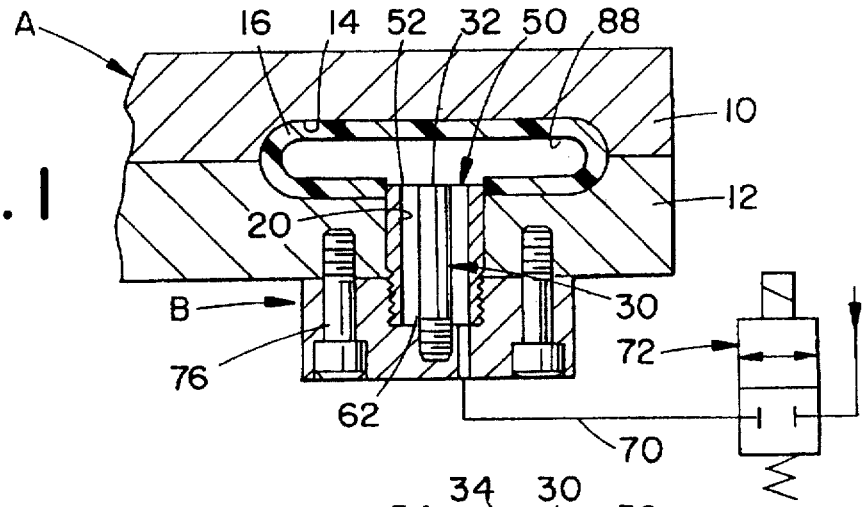
FIG. 1 is a schematic side elevational view, partially in cross-section, of a fluid assisted injection molding apparatus and a mold according to the preferred embodiment of the present invention.

Referring now to the drawings, wherein the showings are for purposes of illustrating preferred and alternate embodiments of the invention only and not for purposes of limiting the same, FIG. 1 shows the subject new fluid assisted injection molding apparatus which includes a mold body A and a fluid injection assembly B. A conventional plastic injection nozzle is associated with the mold body but is not illustrated in this Figure. While the injection molding apparatus of FIG. 1 is primarily designed for and will hereinafter be described in connection with a gas assisted injection molding process utilizing a molten thermoplastic material, it will be appreciated that the apparatus could also be used in various other molding environments in which both a relatively viscous fluid and a relatively non-viscous fluid are injected, such as for the production of lost wax masters and the like.

As is conventionally known, the mold body A includes a first mold half 10 and mating therewith a second mold half 12. As is conventionally known, the mold halves are selectively secured together by a conventional clamping assembly, not illustrated for the sake of simplicity. Defined between the mold halves 10 and 12 is a mold cavity 14. Communicating with the mold cavity and extending to an outer edge of one of the mold halves is a suitable sprue (not illustrated) which allows the injection of a molten thermoplastic 16 into the mold cavity 14. Extending in the second mold half 12 through a suitable aperture 20 located therein is the injection molding assembly B.

Figure 2:
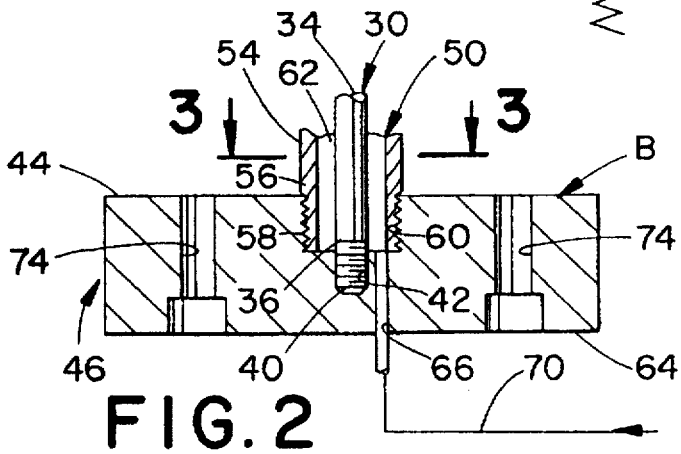
FIG. 2 is an enlarged schematic side elevational view partially in cross-section of a portion of the fluid assisted injection molding apparatus of FIG. 1.

With reference now also to FIG. 2, the assembly B comprises a pin 30 which has a first end 32 (FIG. 1), a central portion 34, and a second end 36. Provided on the second end 36 is a threaded stem 40 which is adapted to be secured in a suitably threaded aperture 42 extending into a first side surface 44 of a support base 46.

Encircling the pin 30 is a sleeve 50 which includes a first end 52, a central portion 54, and a second end 56. Provided on the sleeve second end is a threaded stem 58 which is adapted to be secured in a suitably threaded aperture 60 extending into the support base first side surface 44. Defined between the pin 30 and the sleeve 50 is an annular fluid passage 62 which extends longitudinally from the respective second ends of the sleeve and pin to the respective first ends thereof so as to communicate with the mold cavity 14 as is illustrated in FIG. 1. Extending through the support base 46 from a second side surface 64 thereof so as to communicate with the annular fluid passage 62 is a fluid bore 66. A conventional fitting (not illustrated) enables fluid to flow from a suitable fluid line 70 to the aperture 66. A conventional flow control valve 72 can be provided in the line 70 in order to control the flow of fluid therethrough in both directions.

In this embodiment, the support base is stationary in relation to the second mold half 12. Accordingly, the sleeve and pin are also stationary in relation to the mold half 12 and hence the mold cavity 14.

The support base 46 is also provided with a pair of spaced through bores 74 which extend from the second side surface 64 thereof to the first side surface 44 thereof. Extending through these bores 74 are suitable fasteners 76 which enable the support base 46 to be secured to the mold half 12 as shown in FIG. 1. In the embodiments shown in FIGS. 1–5, the injection molding assembly B does not move in relation to the mold half 12 to which it is secured. Accordingly, the injection molding assembly B is stationary in relation to the mold cavity 14.

Figure 4:
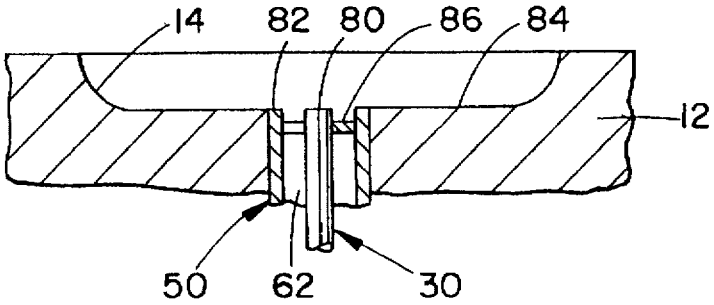
FIG. 4 is an enlarged side elevational view of a portion of the fluid assisted injection molding apparatus of FIG. 1 and an adjacent mold half in a different configuration.

Because the pin 30 is threaded into the support base 46, its front end 32 can be correctly located in relation to the sleeve front end 52. With reference now also to FIG. 4, a front face so of the pin 30 is preferably located even with a front face 82 of the sleeve 50. However, the pin front face so could also be located somewhat ahead of or behind the sleeve front face 82 if desired. Preferably, the sleeve front face 82, and hence the pin front face so are level with the mold half 12 through which they extend such that they are even with a surface 84 of the mold half 12 as shown in FIG. 4. However, it may be advantageous under some circumstances to so position the sleeve and pin that they jut out into the mold cavity 14 as is shown in e.g. FIG. 1. As is best shown in FIG. 4, the pin front face 80 is flat and perpendicular to a longitudinal axis of the pin 30 in order to avoid material hang up at the tip. This could create ejection problems when attempting to eject the injection molded product from the mold cavity.

Figure 3:
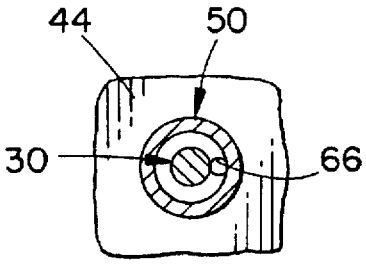
FIG. 3 is a cross-sectional view of the apparatus of FIG. 2 along line 3—3.

Fluid flow between the pin 30 and the sleeve 50 will take place through the fluid flow passage 62 which is defined between them as is best seen in FIG. 3. The fluid flow passage is annular or sleeve like around the pin 30. Preferably, the pin 30 is in the shape of a right cylinder which has a substantially constant diameter, although other shapes of the pin, the sleeve, and hence the fluid flow passage are also possible.

It is believed that the tip of the pin 30, i.e. the flat front face 80 thereof, is advantageously located approximately even with the front face 82 of the sleeve 50. It is believed that with this type of construction, the molten thermoplastic will not have a tendency to cool in the area at the tip of the pin 30 and thereby cause a cold slug of thermoplastic at that point. In addition, it is believed that locating the pin front face 80 adjacent to and preferably even with the front face 82 of the sleeve, it will eliminate a tendency of the plastic to hang up in a gap which would be formed between the pin front face and the sleeve front face if the pin front face were located behind the sleeve front face.

Located in the fluid passage 62 can be a spider 86 which can support the pin 30 so as to prevent it from wobbling or movement in a direction transverse to the longitudinal axis of the pin and the sleeve 50.

In use, an amount of molten thermoplastic sufficient for the preparation of the injection molded product, and normally less than the volume of the mold cavity 14, is injected through a suitable aperture into the mold cavity 14. Either simultaneously therewith or thereafter, a quantity of a suitable non-viscous fluid, such as a gas, is introduced into the fluid line 70, and when allowed by the valve 72, will flow into the fluid bore 66 and hence into the annular passage 62 defined between the pin 50 and the sleeve 50. The fluid, which is preferably a neutral gas such as nitrogen, forms a fluid cavity 88 or one or more fluid flow channels in the molten thermoplastic material 16 held in the mold cavity 14 and pushes the molten thermoplastic out against the walls of the mold cavity. The thermoplastic material is thereupon allowed to cool until it is capable of retaining the shape imposed on it by the mold cavity. Subsequently, the fluid is vented from the fluid cavity 88 created in the thermoplastic material back through the passage 62 and the fluid line 70 as regulated by the valve 72.

As stated previously, one of the major problems with gas assisted injection molding is that, during venting, still molten plastic is sucked back into the gas flow passages blocking such passages and preventing any further gas flow through them. One advantage of the construction illustrated in all the FIGURES herein is that only an annular fluid flow path is provided around the pin instead of a central flow path. This annular path will limit the entry during venting of any molten thermoplastic in the form of strings or pantries. Any thermoplastic remaining molten at the start of the venting process is located at the gas plastic interface at the wall of the gas cavity. A turbulent gas flow, which it is believed is caused by the cooperation of the pin and sleeve so as to provide an annular flow path (and no central flow path) around the periphery of the pin will throw such molten plastic outwardly outside the flow path of the gas or directly onto the flat front tip of the pin.

If desired, the gap between the pin 30 and the sleeve 50 can be on the order of 0.016 in. (0.004 cm). While this gap is minuscule, a suitable volume of gas is able to flow through this space due to the sleeve like or annular nature of the flow path. Due to the annular shape of the flow path, there is enough area provided in the flow path to enable the gas to flow in and out of the mold cavity 14. The area of the flow path defined between the pin and the sleeve can be on the order of 0.00326 sq. in. (0.021 sq. cm.) with a suitably sized pin [0.125 inches (0.318 cm) in diameter] and sleeve [0.1406 inches (0.357 cm) sleeve inner diameter].

Figure 5:
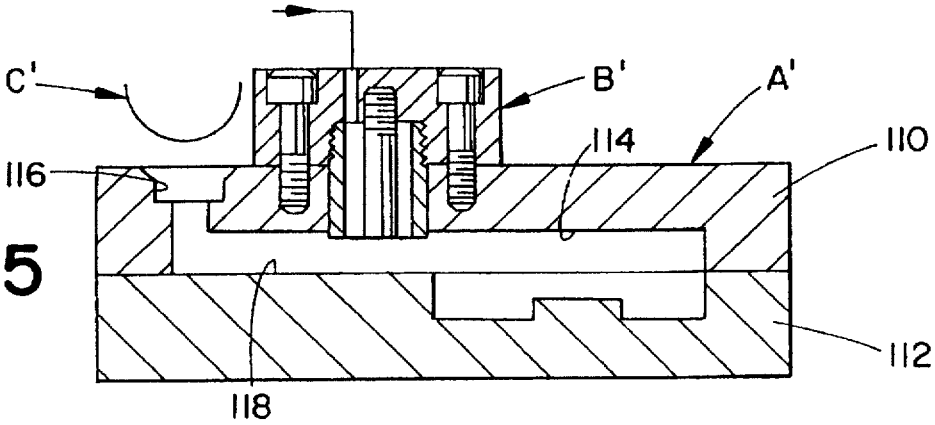
FIG. 5 is a schematic side elevational view, partially in cross-section, of a fluid assisted injection molding apparatus and a mold according to a first alternate embodiment of the present invention.

With reference now to FIG. 5, the injection molding assembly is illustrated as extending into a runner of a mold instead of into the mold cavity itself. For ease of illustration and comprehension of this alternative, like components are identified by like numerals with a primed suffix (') and new components are identified by new numerals.

In this embodiment, a mold body A' includes first mold half 110 and a second mold half 112 which define between them a mold cavity 114. Communicating with the mold cavity and extending to an outer edge of the first mold half 110 through a suitable sprue 116. Adapted to selectively engage the sprue 116 is a suitable conventional plastic injection nozzle C'. Communicating the mold cavity 114 with the sprue 116 is a runner 118. Extending into the runner is an injection molding assembly B'. The assembly can be identical to the assembly illustrated in FIGS. 1–4. Under certain circumstances it is advantageous to inject the fluid material into the runner rather than directly into the mold cavity 114. This may be useful, e.g. in situations where a series of interconnected hollow cavities are provided in the molded pan rather than separate non-interconnected cavities. For the latter, a series of in-the-mold type fluid injection assemblies would be necessary.

With reference now to FIG. 6, a movable type of injection molding apparatus is there illustrated. For ease of illustration and comprehension of this alternative, like components are identified by like numerals with a double primed suffix (") and new components are identified by new numerals.

In this embodiment, a mold A" includes a first mold half 10" and a second mold half 12" which between them define a mold cavity 14". Extending through an aperture 20" in the second mold half 12" is an injection molding assembly B". As best shown in FIG. 7, the assembly comprises a pin 30" which is encircled by a sleeve 50" so as to define therebetween an annular fluid passage 62". Preferably located adjacent the mold cavity 14" and encircling the sleeve 50" is a bushing 148. The bushing is advantageous in reducing the wear on the outer periphery of the sleeve as the sleeve, and the pin, reciprocate in relation to the second mold half 12".

With reference now also to FIG. 8, the pin and sleeve are secured by suitable threaded ends 42" and 58" in suitably threaded apertures provided in a reciprocating first wedge block 150. The Wedge block 150 has a flat upper surface 152 and an angled lower surface 154 which rests on an angled upper surface 156 of a second wedge block 160. The second wedge block has a flat lower surface 162 which is slidably supported on a base plate 164 that is secured to the lower mold member 12". A piston rod 166 of a piston and cylinder assembly 167 is secured to an end surface 168 of the second wedge block 160.

It is evident that a longitudinal reciprocation of the second wedge block 160 will lead to a vertical reciprocation of the first Wedge block 150. Extending into the first wedge block 150 is a first fluid passage 170 which communicates with a second fluid passage 172 that, in turn, communicates with the annular gas passage 62" in order to allow the flow of fluid therethrough.

In order to bias the first Wedge block 150 away from the mold cavity 14", one or more springs 114 can be provided between the upper surface 152 of the wedge block 150 and the mold section 12".

With reference now to FIG. 9, an alternate embodiment of a mechanism for reciprocating the gas injection assembly is there illustrated. For ease of illustration and comprehension of this alternative, like components are identified by like numerals with a triple primed suffix ("') and new components are identified by new numerals.

In this embodiment, a solid pin 30"', is encircled by a sleeve 50"' so that defined between these two elements is an annular fluid flow passage 62"'. A lower end of the pin 30"' is provided with a threaded stem 42"' and a lower end of the sleeve 50"' is provided with a threaded section 58"'. The threaded ends of these two elements are secured in suitable mating threaded apertures in a piston 180. The piston is, in turn, held for reciprocation in a cylinder 182. The cylinder is provided with a first aperture 184 located on one end wall through which aperture the pin and sleeve can extend, much in the way a piston rod would. Encircling the sleeve is a suitable conventional sealing member such as an O-ring 186 which is housed in a groove located in the end wall of the cylinder as is illustrated.

Housed in suitably shaped spaced grooves extending around the circumference of the piston 180 are sealing elements 188 which can also be in the form of O-rings or the like. Extending through a second aperture 190 provided in a side surface of the cylinder 182 is a fitting 192. A fluid line 194 is secured by the fitting 192 to the cylinder 182. The fluid line 194 communicates with a suitable bore 196 which extends through the piston to the pin 30"' so as to allow the bore 196 to communicate with the annular fluid passage 62"' defined between the pin and the sleeve. A groove 198 extends circumferentially around the periphery of the piston 180, between the sealing elements 188, in order to allow a pressurized fluid to flow from the fitting 192 into the bore 196. The groove 198 is sufficiently wide so as to allow such fluid flow at all the possible positions of the piston 180 as it reciprocates in the cylinder 182.

The stroke of the pin and sleeve arrangement can be on the order of 0.5 to 1.5 inches if desired. The fluid injecting apparatus will reciprocate as the piston 180 reciprocates in the cylinder 182. In order to reciprocate, the piston 180 suitable fluid flow lines (not illustrated) can communicate with respective ends of the cylinder 182 as is known (See, e.g., FIG. 10). Utilizing this assembly, a pressurized gas or similar fluid can flow from a source of pressurized fluid through the fluid line 194, the fitting 192, the bore 196, and the annular passage 62"' and into the mold cavity. For venting, the fluid can flow back through the annular passage 62"' the bore 196, and the fluid line 194.

Figure 10:
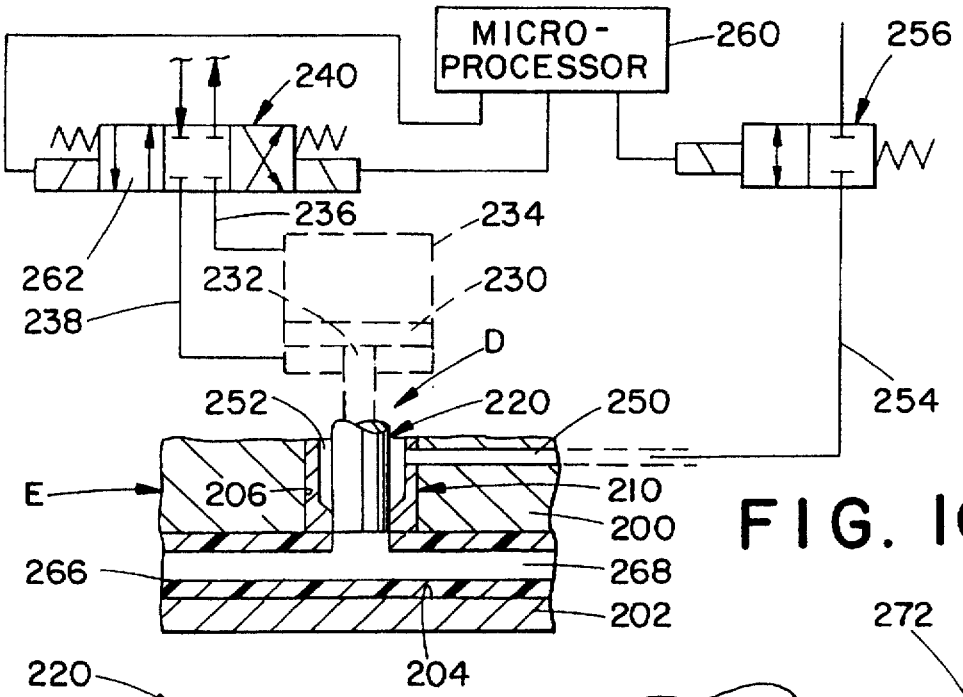
FIG. 10 is a schematic side elevational view, partially in cross-section, of a fluid assisted injection molding apparatus and a mold in the form of a reciprocating pin according to the present invention.
Figure 11:
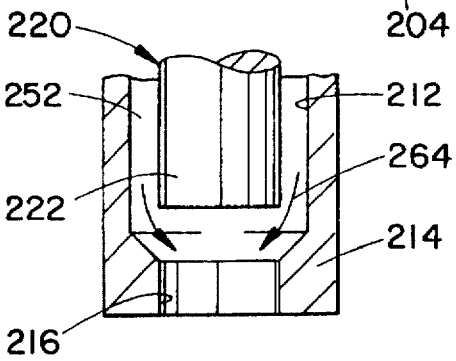
FIG. 11 is an enlarged side elevational view of a portion of the apparatus of FIG. 10.

With reference now to FIG. 10, another embodiment of a fluid injection assembly D is there illustrated. The injection assembly enables the flow of a suitable fluid into a mold assembly E which comprises a first mold half 200 and a second mold half 202. The mold halves cooperate to form a mold cavity 204. Extending through a bore 206 in the first mold half 200 is the fluid injection assembly D. With reference now also to FIG. 11, the assembly comprises a stationary sleeve member 210 (FIG. 10) that is secured in place in relation to the first mold half 200. The sleeve has extending longitudinally therethrough a bore 212 and includes a first end 214 which is thickened so as to create a reduced diameter bore section 216. Adapted to reciprocate in the sleeve 210 is a pin 220, which may be in the shape of a fight cylinder if so desired. The pin 220 has a first end 222 which is of a suitable diameter that it closely matches the diameter of the reduced diameter bore section 216 of the sleeve. In this way, as shown in FIG. 10, the pin and sleeve cooperate so as to substantially seal against one another and prevent a flow of fluid therepast. To this end, the surface of the bore section 216 may be nitrided or the like in order to harden it and allow little wear as the pin slides back and forth in relation to the sleeve.

Reciprocating the pin is a piston and cylinder assembly which includes a piston 230 to which a second end 232 of the pin is secured. The piston is arranged in a cylinder 234 as is well-known and the pin forms the piston rod of the mechanism. A suitable fluid can flow through respective lines 236 and 238 which communicate with the two ends of the cylinder 234 in order to pressurize one of the surfaces of the piston 230 thereby allowing the piston to reciprocate in the cylinder 234. Such reciprocation of the piston will also cause a reciprocation of the pin 220 in relation to the sleeve 210.

While in the embodiment illustrated in FIG. 10, the pin 220 is shown as being reciprocated in relation to a stationary sleeve 210, it should be appreciated from FIG. 11 that the pin could be held stationary and the sleeve could be made to reciprocate instead. This could be done by fastening the sleeve to the piston instead of fastening the pin to the piston if, for some reason, that is found to be a more desirable approach. All that is required for this embodiment of the invention is that the two elements be capable of reciprocating with respect to each other.

Selectively allowing a flow of a pressurized fluid to one of the fluid lines 236 and 238 is a suitable conventional valve 240 which may, if desired, be a three envelope four way valve that is solenoid actuated to either end or flow position and is spring biased to a center or blocked position. Also provided for the assembly is a fluid flow line 250 which extends in the first mold half 200 and communicates with a toroidal or sleeve like opening 252 formed between the pin 220 and the sleeve 210 when the pin is retracted, as is best shown in FIG. 11. The fluid line 250 communicates through a suitable conventional fitting (not illustrated) with a fluid line 254. Positioned in the fluid line 254 is a suitable on/off valve 256 which can be spring biased to an off position and solenoid actuated to an on position, if desired, as is illustrated.

Controlling the actuation of the valves 240 and 256 can be a suitable microprocessor 260. With such a microprocessor, a selected series of steps to actuate the mechanism D can take place. More specifically, the microprocessor can command the valve 140 to shift to its rightmost position such that a fight envelope 262 of the valve 240 allows a flow of pressurized fluid to the second line 236 thereby pressurizing a front side of the piston 230 and pushing the piston away from the mold cavity 204. This will pull the pin 220 out of its sealing engagement with the sleeve 210 as shown in FIG. 11. At this time, the microprocessor can actuate the valve 256 thereby allowing a flow of the pressurized fluid through the lines 254 and 250 and into the toroidal opening 252 formed between the pin 220 and the sleeve 210. Pressurized fluid will thus flow toward the mold cavity 204 as shown by arrows 264. The pressurized fluid will then push a thermoplastic 266 which is already in the mold cavity out against the walls thereof so as to allow a centrally located fluid cavity 268 to form in the mold cavity 204.

Figure 12:
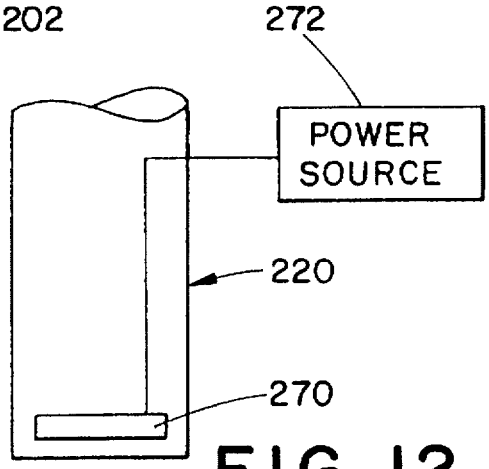
FIG. 12 is an enlarged side elevational view of a portion of the apparatus of FIG. 11.

In order to insure that the thermoplastic adjacent the assembly D does not solidify to such an extent as to prevent the retraction of the pin 220, a suitable heater cartridge 270 can be provided at the front end of the pin 220, as shown in FIG. 12. The heater cartridge may be driven by a suitable conventional power source 272 as is well known.

Figure 13:
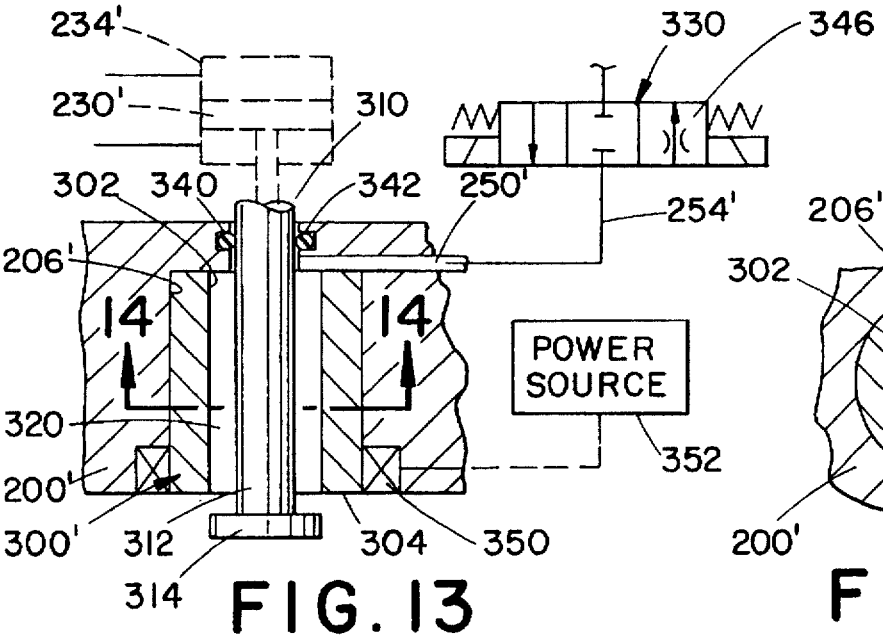
FIG. 13 is a side elevational view of an alternate embodiment of a fluid assisted injection molding apparatus employing a reciprocating pin according to the present invention.
Figure 14:
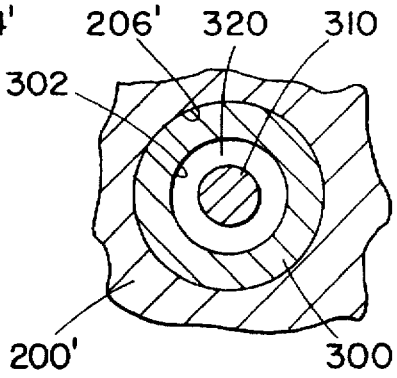
FIG. 14 is a cross-sectional view of the apparatus of FIG. 13 along lines 14—14.

With reference now to FIGS. 13 and 14, an alternate embodiment of a moving pin and sleeve fluid assisted injection molding assembly is there illustrated. For ease of appreciation and comprehension of this alternative, like components are identified by like numerals with a primed (') suffix and new components are identified by new numerals.

With reference now to FIG. 13, located in a mold half 200' is a bore 206' in which is positioned a sleeve 300. The sleeve has a bore 302 extending longitudinally therethrough and a first end 304 located on a mold cavity defining surface of the mold half 200'. Mounted for reciprocation within the bore 302 of the sleeve 300 is a pin 310. The pin includes a first end 312 on which is mounted a cap member 314. The cap is so sized in diameter as to cooperate with the first end a04 of the sleeve when the pin 310 is retracted to as to provide a seal between the pin cap 314 and the sleeve first end 314.

Defined between the pin 310 and the sleeve 300 is a toroidal fluid flow path 320, as can be best seen in FIG. 14. In other words, when the pin is extended as shown in FIG. 13, a suitable fluid can flow from a source (not illustrated) as regulated by a valve 330 through a fluid line 254' and then a bore 250' extending in the mold half 200' and communicating with the aperture 206' in which the sleeve 300 is fastened. Fluid can then flow through the toroidal path 320 and out into a mold cavity 204'.

The pin 310 is reciprocated by use of a suitable piston 230' and cylinder 234' assembly. To prevent a flow of pressurized fluid in the wrong direction and away from the mold cavity 204', a suitable seal member 340 can be positioned in a groove 342 located in the mold half 200' so that the seal encircles the pin 310 and prevents a flow of fluid therepast.

The valve member 330 can be a three envelope on/off valve which can be solenoid actuated to either end position, to allow a flow fluid, and spring biased to a center off position to prevent such flow as is illustrated. If desired, an outflow envelope 346 of the valve 330 can be provided with a flow limiting feature as is illustrated to regulate the outflow of pressurized fluid from the mold cavity after the injection molding procedure is finished and venting is taking place.

In order to prevent the solidification of molten thermoplastic material in the vicinity of the pin 310 before the injection of fluid occurs, a suitable heater band 350 can encircle the sleeve first end 304 as shown in FIG. 13. The heater band 350 can be powered from a suitable conventional power source 352 as is known to those skilled in the art.

Figure 15:
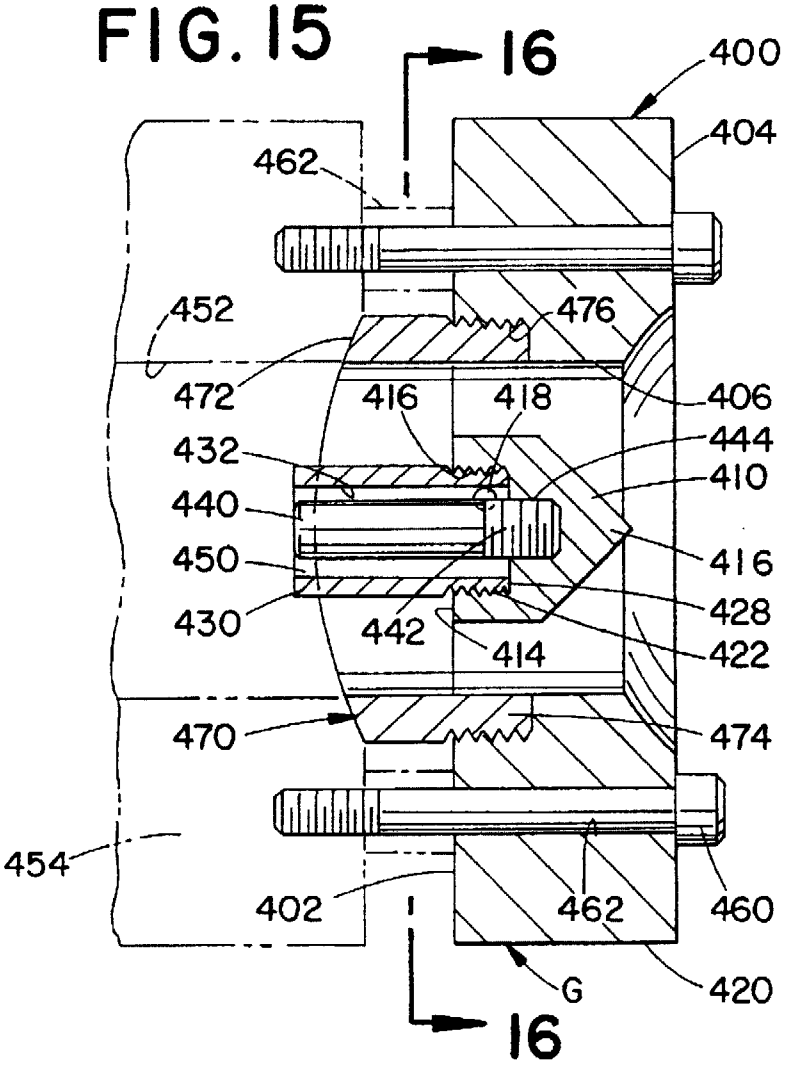
FIG. 15 is a schematic side elevational view of a fluid assisted injection molding apparatus in the form of a sprue bushing.

With reference now to FIG. 15, the use of a toroidal flow path for fluid in a fluid assisted injection molding process can also be provided in a sprue bushing environment. More specifically, such a sprue bushing G can comprise an adaptor body 400 which can be substantially disk-like if desired, although it could have any other conventional shape as well. The body includes a front end 402 and a rear end 404. Extending longitudinally through the body 400, substantially along its centerline from the front end to the rear end, is a bore 406 which accommodates a flow of a relatively viscous fluid, such as a molten thermoplastic, through the body.

Figure 16:
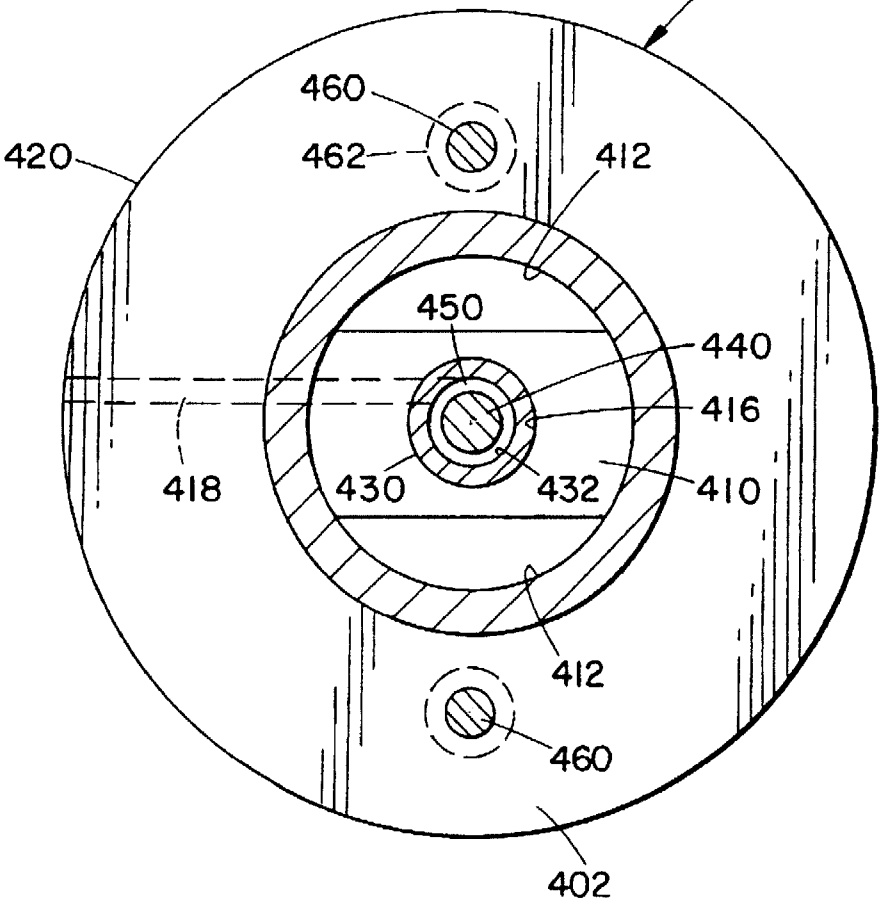
FIG. 16 is a front elevational view, partially in cross-section, of the sprue bushing of FIG. 15 along lines 16—16; and, FIG. 17 is a schematic side elevational view partially in cross-section of an alternate embodiment of a sprue bushing according to the present invention.

Extending transversely across the bore 406 between opposing walls of the bore and adjacent the body front end 402 is a bridge 410. Fluid flow is allowed through the first bore 406 around the bridge through semi-circular slots 442 as can be best seen in FIG. 16. The bridge 410 has a substantially flat front surface 414 and a tapered rear surface 416, which terminates in the bore 406 and splits the flow of molten thermoplastic into the two slots 412. Extending into the bridge 410 from the front surface thereof is a first bore 416. Communicating with the bore 416 is a fluid flow channel 418 which extends from an outer periphery 420 of the body 400 radially inwardly to the bore 416 as perhaps can be best seen in FIG. 16.

Provided in the body first bore 416 is a threaded area 422 which cooperates with a suitable threaded end section 428 of a sleeve 430 that is secured to the body 400. The sleeve 430 extends away from the body 400 and includes a longitudinally extending through bore 432 which communicates with the first bore 416.

Extending through the bore 432 is a pin 440. The pin has a first end 442 which is threaded and is accommodated in a suitably threaded aperture 444 provided in the bridge 410 as is illustrated in FIG. 15. Defined between the pin 440 and the sleeve 430 is a toroidal flow path 450. A suitable pressurized fluid can thus flow through the fluid channel 418 into the first aperture 416 and through the toroidal flow path 450. The fluid, preferably a neutral gas, can then flow into a bore 452 of a suitable sprue body 454 which is schematically illustrated in FIG. 15 and hence into a mold cavity as is well known in the art.

In order to fasten the body 400 to the sprue body 454, it is desirable to provide fasteners 460 which extend through suitable transversely extending bores 462 through the body 400.

If it is desired to thermally insulate the sprue body 454 from the sprue bushing 400, one could provide spacers 462 around the fasteners 460 and positioned between the sprue body 454 and the sprue bushing 400. In this way, while the sprue bushing 400 is kept at a hot temperature by the adjacent injection molding nozzle (not illustrated in this view), the sprue body 454 could be maintained at a cooler temperature.

In order to insure that the molten thermoplastic flowing through the bore 406 is confined to the sprue body bore 452 as it flows out of the sprue bushing 400, an outer sleeve 470 can be provided. The outer sleeve can have a first end 472 which mates with a surface of the sprue body 454 and a second end 474 which is threaded so as to be accommodated within a suitably threaded counterbore 476 in the sprue bushing 400. A relatively small thermal flow path would be provided between the bushing 400 and the sprue 454, namely through the fasteners 462, the outer sleeve 470, and the spacer 464. In order to provide thermal insulation, these elements could be made from a relatively non-conducting material.

Figure 17:
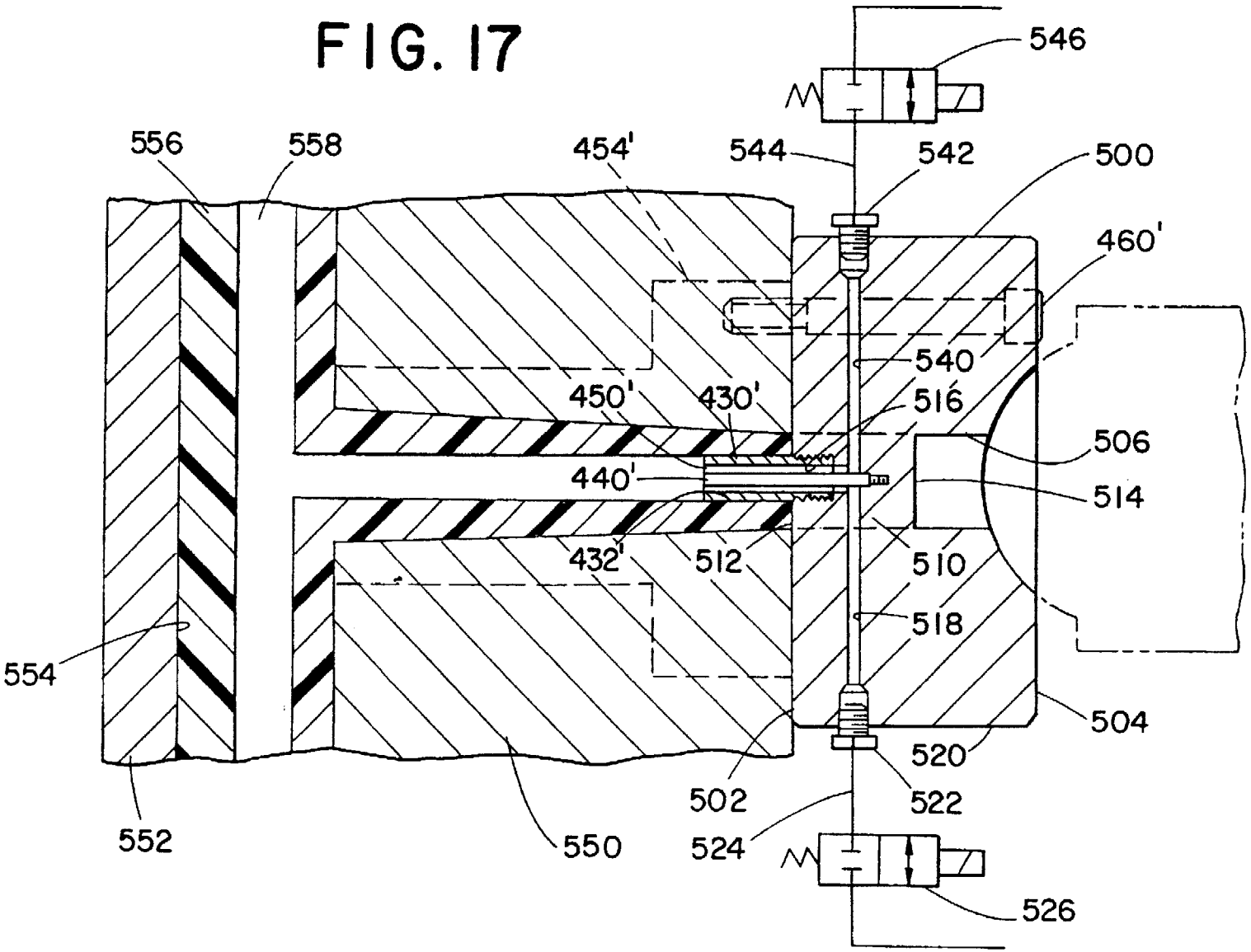

With reference now to FIG. 17, an alternate embodiment of a sprue bushing is there illustrated. For ease of comprehension and appreciation, like components are identified by like numerals with a primed suffix (') and new components are identified by new numerals.

In this embodiment, a sprue bushing 500 includes a front end 512 and a rear end 514. Extending longitudinally through the bushing 500, substantially along its centerline, from the rear end 504 to the front end 502 is a bore 506 which accommodates a flow of a relatively viscous fluid such as a molten thermoplastic through the body.

Extending transversely across the bore 506 between opposing walls of the bore and adjacent the sprue bushing front end 502 is a bridge 510. Fluid flow is allowed through the bore 506 around the bridge through semi-circular slots (not visible in FIG. 17) of the bore. The bridge 510 has a substantially flat front surface 512 and a tapered rear surface 514 which terminates in the bore 506 and splits the flow of molten thermoplastic. Extending into the bridge 510 from the front surface 512 thereof is a first bore 516 which accommodates a flow of a relatively non-viscous fluid, such as a neutral gas, air, or steam. The first bore 516 terminates on the bridge surface in such a manner as to be substantially coaxial with the sprue bushing longitudinal bore 506.

The first bore 506 communicates with a second bore 518 extending approximately normal to the first bore in the sprue bushing from an outer periphery 520 thereof. Provided at the outer periphery 520 is a fitting 522 which communicates the first bore 518 with a fluid flow line 524. Positioned in the fluid flow line is a suitable valve 526. While the valve illustrated is a two envelope control flow valve which is solenoid actuated to an on position and spring biased to an off position, it should be appreciated that a wide variety of other valves could also be utilized. Provided in the sprue bushing first bore 516 is a threaded area which cooperates with a suitable threaded end section of a sleeve 430' that is secured to the sprue bushing 500. The sleeve 430' extends away from the sprue bushing and includes a longitudinally extending through bore 432' which communicates with the first bore 516. Extending longitudinally in the sleeve 430' is a pin 440' which itself is fastened to the sprue bushing 500. The pin 440' is so located in the sleeve 430' that a toroidal flow path 450' is defined between them. The flow path enables the flow of a fluid between the pin and the sleeve.

In the embodiment illustrated in FIG. 17, a second bore 540 extends radially away from the pin 440' to the outer periphery 520 of the sprue bushing 500. The second bore 540 communicates with the first bore 518. Located adjacent the outer periphery 520 of the sprue hushing 500 is a second fitting 542 which enables the bore 540 to communicate with a second fluid line 544. Located in the second fluid line is a suitable valve 546 to control the flow of fluid through the line 544, and hence through the bore 540. The use of two separate bores may be advantageous under certain circumstances. This may include, for example, the flow of fluid in through the first bore 518 and out through the second bore 540 or simultaneous flow through both bores in both directions.

In this embodiment, the sprue bushing 500 is directly fastened, such as by fastener 460' to a sprue body 454' such that the sleeve 430' and pin 440' extend into a sprue body bore 452'. As is well known, the sprue body is secured in a first mold half 550. Defined between the first mold half 550 and a second mold half 552 is a mold cavity 554. When a thermoplastic 556 flows through the bore 506 and into the sprue body bore 452' and hence into the mold cavity 554, then a fluid such as a neutral gas can be injected into the molten stream through the annular flow path 450' defined between the pin 440' and the sleeve 430' so as to create a fluid or gas cavity 558 in the thermoplastic 556. Venting of the gas can take place back through the annular gas passage 450' when the molten thermoplastic has set and it is desired to remove the molded plastic part.

The invention has been described with reference preferred and alternate embodiments. Obviously, modifications and alterations will occur to others upon a reading and understanding of the preceding detailed description. It is intended that the invention be construed as including all such modifications and alterations insofar as they come within the scope of the appended claims or the equivalents thereof.

Having thus described the preferred and alternate embodiments, the invention is now claimed to be:

1. An apparatus for use in fluid-assisted injection molding of plastic material so as to form an injection molded product, the apparatus comprising:

a pair of mold members defining, when closed, a sealed cavity;

a first opening provided in one of said mold members for allowing the injection of a plastic material into said cavity;

a second opening provided in one of said mold members, and spaced from said first opening, for allowing the injection of a fluid into said cavity;

a sleeve extending through said second opening, said sleeve having a longitudinally extending bore with an open first end;

[a first means for rigidly securing said sleeve in relation to said one of said mold members;]

a pin extending through said sleeve;

[a second means for rigidly securing said pin in relation to said sleeve;] and, an annular fluid flow passage defined between a tip of said pin and a tip of said sleeve.

2. The apparatus of claim 1 further comprising a nozzle body positioned adjacent one of said mold body members.

3. The apparatus of claim 1 wherein said sleeve includes a first end which extends past a wall of said one of said mold members.

4. The apparatus of claim 1 wherein said longitudinally extending bore of said sleeve has a substantially constant diameter at and adjacent a sleeve first end.

5. The apparatus of claim [1] *29* wherein said second means for rigidly securing comprises:

a threaded end of said pin; and, a support base which is fastened to said one of said mold members, said support base having a threaded opening in which said pin threaded end is secured.

6. The apparatus of claim 1 wherein said pin includes a first end located substantially even with a sleeve first end.

7. The apparatus of claim [1] *28* wherein said first means for rigidly securing comprises:

a sleeve second end;

a support base to which said sleeve second end is secured; and, a fastener for securing said flange to said one of said mold members.

8. The apparatus of claim 1 wherein said flow passage defined between said pin and said sleeve element is substantially constant in area.

9. The apparatus of claim 5 wherein said support base comprises a fluid passage which communicates with said flow passage defined between said pin and said sleeve.

10. The apparatus of claim 7 wherein said sleeve second end comprises a threaded portion and said support base comprises a threaded bore in which said sleeve threaded portion is engaged.

11. The apparatus of claim 1 wherein said pin comprises a right cylinder having a substantially constant diameter.

12. The apparatus of claim 1 wherein said sleeve first end is so positioned in relation to said one of said mold members as to be even with a mold cavity wall of said one of said mold members.

13. A bushing for an injection molding machine and positioned between a nozzle thereof and a sprue of a mold, comprising:

a body having a longitudinal axis, a front end, a rear end and an exterior periphery:

a first bore which extends parallel to said longitudinal axis from said rear end to said front end of said body for accommodating a first fluid;

a bridge extending transversely across said first bore between opposing walls of said bore adjacent said body first end, fluid flow being allowed in said first bore around said bridge;

a second bore which extends in said bridge and in said body for accommodating a second fluid, said second bore terminating adjacent said body front end;

a sleeve having a first end and a second end, said sleeve first end being secured to said body front end and said sleeve extending away therefrom such that said sleeve second end is located forwardly of said body, said sleeve having a through bore which is in fluid communication with said second bore;

a pin extending longitudinally in said sleeve through bore; and, a fluid flow passage defined between said sleeve and said pin.

14. The bushing of claim 13 wherein said pin has a first end secured to said bridge and a second end, said pin second end being approximately even with said tube second end.

15. The bushing of claim 13 wherein said pin comprises a right cylinder having a substantially constant diameter.

16. The bushing of claim 13 further comprising an outer sleeve having a first end, secured to said body first end, and a second end, said sleeve extending away from said body first end in a direction coaxial with said sleeve and encircling said sleeve.

17. The bushing of claim 13 wherein said flow passage defined between said pin and said sleeve element is substantially constant in area.

18. The bushing of claim 13 wherein said through bore of said sleeve has a substantially constant diameter at and adjacent said sleeve second end.

19. The bushing of claim 13 wherein said sleeve and said pin extend into a bore of the sprue of the mold.

20. The bushing of claim 13 further comprising fastening means for securing said bushing to one of the nozzle of the injection molding machine and the sprue of the mold.

21. An apparatus for injecting a molten thermoplastic material and a fluid, comprising:

a pair of mold members defining, when closed, a sealed cavity;

a first opening provided in one of said mold members for allowing the injection of a plastic material into said cavity;

a second opening provided in one of said mold members, and spaced from said first opening, for allowing the injection of a fluid into said cavity; and, a fluid injection assembly disposed for reciprocating movement in said second opening in relation to said sealed cavity to control a flow of fluid into said cavity, said assembly comprising:

a pin, a sleeve coaxial with said pin and encircling said pin, and a fluid flow passage defined between said pin and said sleeve said pin and sleeve being fixedly secured in relation to each other.

22. The apparatus of claim 21 wherein said fluid injection assembly further comprises a base to which said pin and said sleeve are both rigidly secured, such that said pin and said sleeve do not move in relation to each other.

23. The apparatus of claim 22 further comprising a bore located in said base and in fluid communication at one end with said fluid flow passage.

24. The apparatus of claim 21 wherein said fluid injection assembly further comprises a selectively movable base, said pin being rigidly secured to said base and said sleeve being secured to said one of said mold members such that said pin moves in relation to said sleeve.

25. The apparatus of claim 24 wherein said base includes a bore which is in fluid communication at one end with said fluid flow passage.

26. The apparatus of claim 21 further comprising a means for reciprocating said fluid injection assembly.

27. The apparatus of claim 25 wherein said means for reciprocating comprises a piston and cylinder assembly.

*28. The apparatus of claim 1 further comprising a first means for rigidly securing said sleeve in relation to said one of said mold members.*

*29. The apparatus of claim 28 further comprising a second means for rigidly securing said pin in relation to said sleeve.*

*30. An apparatus for injecting a molten thermoplastic material and a fluid comprising:*

*a pair of mold members defining when closed, a sealed cavity and a runner;*

*a first opening provided in one of said mold members for allowing the injection of a plastic material into said runner and said cavity;*

*a second opening provided in one of said mold members and spaced from said first opening for allowing the injection of a fluid into at least one of said cavity and said runner; and,*

*a fluid injection and exhaust assembly disposed in said second opening to direct a flow of fluid into and out of said at least one of said cavity and said runner, said fluid injection and exhaust assembly comprising:*

*a pin,*

*a sleeve coaxial with said pin and encircling said pin, and*

*a fluid flow passage defined between said pin and said sleeve, wherein said fluid flow passage is open at all times during the operation of the apparatus.*

*31. The apparatus of claim 30 further comprising a second means for rigidly securing said pin in relation to said one of said mold members.*

*32. The apparatus of claim 30 further comprising a second means for rigidly securing said pin in relation to said one of said mold members.*

*33. The apparatus of claim 30 wherein said flow passage defined between said pin and said sleeve is annular.*

*34. The apparatus of claim 30 wherein said pin comprises a right cylinder having a substantially constant diameter.*

*35. The apparatus of claim 30 wherein said sleeve comprises a reduced diameter bore section.*

*36. The apparatus of claim 30 wherein said pin comprises an increased diameter section.*

* * * * *